US009306802B2

(12) United States Patent
Roby et al.

(10) Patent No.: US 9,306,802 B2
(45) Date of Patent: Apr. 5, 2016

(54) DISPLAYING FTE CABLE STATUS AS UCN CABLE STATUS

(71) Applicant: HONEYWELL INTERNATIONAL INC., Morristown, NJ (US)

(72) Inventors: Steven Roby, Glendale, AZ (US); Basanth Chinivar, Karnataka (IN); John Michael Prall, Cave Creek, AZ (US); Michael Novak, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 183 days.

(21) Appl. No.: 14/081,570

(22) Filed: Nov. 15, 2013

(65) Prior Publication Data
US 2014/0369207 A1 Dec. 18, 2014

Related U.S. Application Data

(60) Provisional application No. 61/835,200, filed on Jun. 14, 2013.

(51) Int. Cl.
H04L 12/24 (2006.01)
H04L 12/26 (2006.01)
H04L 12/703 (2013.01)

(52) U.S. Cl.
CPC ........ *H04L 41/0677* (2013.01); *H04L 43/0811* (2013.01); *H04L 43/0817* (2013.01); *H04L 45/28* (2013.01); *H04L 43/50* (2013.01)

(58) Field of Classification Search
CPC .................................................. H04L 41/0686

USPC .................................................. 370/241, 242
See application file for complete search history.

(56) References Cited

U.S. PATENT DOCUMENTS

| 4,964,120 | A | * | 10/1990 | Mostashari | 370/228 |
| 5,818,906 | A | * | 10/1998 | Grau et al. | 379/32.04 |
| 6,691,165 | B1 | * | 2/2004 | Bruck et al. | 709/227 |
| 6,972,687 | B1 | * | 12/2005 | Marshall et al. | 340/686.1 |
| 7,397,385 | B1 | * | 7/2008 | Bajpay et al. | 340/652 |
| 8,184,933 | B1 | * | 5/2012 | Aybay | 385/100 |
| 2003/0012135 | A1 | | 1/2003 | Leroux et al. | |
| 2003/0095505 | A1 | * | 5/2003 | Wells et al. | 370/242 |
| 2005/0246572 | A1 | | 11/2005 | Wilson et al. | |
| 2008/0117068 | A1 | * | 5/2008 | Sandstrom | 340/635 |

(Continued)

FOREIGN PATENT DOCUMENTS

WO 2005094000 10/2005

*Primary Examiner* — Chi H Pham
*Assistant Examiner* — Robert Lopata
(74) *Attorney, Agent, or Firm* — Jetter & Associates, P.A.

(57) ABSTRACT

A method of displaying fault tolerant Ethernet (FTE) cable status in a process control system having FTE devices in an Enhanced Universal Control Network (EUCN) including an Enhanced Network Interface Module (ENIM) on a UCN status display. Updated FTE cable status is obtained from each of the FTE devices during operation of the process control system. The updated FTE cable status from each of the FTE devices is stored in a memory. A UCN cable status word (CSW) including cable status bits allocated for representing the updated FTE cable status is compiled for each of the FTE devices, wherein locations for the cable status bits in the UCN CSW are used by the UCN status display to show changes in cable status. The UCN CSWs are read at a node having the UCN status display, and the updated FTE cable status is displayed on the UCN status display.

13 Claims, 5 Drawing Sheets

(56) References Cited

U.S. PATENT DOCUMENTS

| | | |
|---|---|---|
| 2010/0164505 A1 | 7/2010 | Breed et al. |
| 2011/0176550 A1 | 7/2011 | Wang et al. |
| 2014/0201260 A1* | 7/2014 | Dor et al. .................. 709/203 |

* cited by examiner

DISPLAYING FTE CABLE STATUS AS UCN CABLE STATUS

CROSS REFERENCE TO RELATED APPLICATIONS

This application claims the benefit of Provisional Application Ser. No. 61/835,200 entitled "DISPLAYING FTE CABLE STATUS AS UCN CABLE STATUS", filed Jun. 14, 2013, which is herein incorporated by reference in its entirety.

FIELD

Disclosed embodiments relate to control networks having redundant cables over which control network nodes communicate, including displaying a detected fault in a cable from which any of the nodes is receiving signals.

BACKGROUND

When a process control system is configured as a local area network (LAN) to control an industrial process, the reliability of the LAN is generally a high priority requirement. Reliability of a LAN can be significantly increased by redundancy of the modules, or nodes, of the LAN and the media over which the nodes communicate, such as over a coaxial cable or Ethernet cable.

SUMMARY

Disclosed embodiments recognize with the development of the Enhanced Universal Control Network (EUCN) having a Fault Tolerant Ethernet (FTE) as opposed to the earlier Universal Control Network (UCN) having coaxial cable disclosed in U.S. Pat. No. 4,964,120 to Mostashari, the redundant cable status for the devices in the EUCN need to have a way to be displayed to the user in the same manner as been used when using the existing legacy system status displays to allow a seamless transition. However, these existing displays only show data representing a cable status from a coaxial cable-based UCN, which is based on a Token Bus Controller (TBC) network, so that without modifications to the system the user at the Universal Station (or other node location) in the PCN would not be able see the status of the Ethernet cables (Ethernet status).

Disclosed embodiments include methods of displaying FTE cable status for FTE devices in a EUCN on a legacy display or UCN status display. As used herein, "enhanced" as in EUCNs, Enhanced High Performance Process Managers (EHPMs) and Enhanced Network Interface Modules (ENIMs) refers to such devices having Ethernet connectivity, expanded process controller interoperability, and better diagnosability compared to their token bus controller-based network with coaxial cable media counterparts. The enhancement is enabled by placing these devices/nodes on the Ethernet, giving users enhanced and simpler ways to diagnose Ethernet cable problems, and providing greater interoperability with other controllers (e.g. Honeywell International's Experion C300's). A non-enhanced Universal Control Network (UCN) having conventional non-enhanced NIMs and conventional non-enhanced Process Managers cannot do these things as they are part of a token bused controller-based network using coaxial cable media. Also used herein, an "FTE device" is a device which can transmit and receive FTE cable status data, generally being a device that is compliant with the International Electrotechnical Commission (IEC) 62439 clause 4 (Edition 1.0 2010-02) specifications.

In addition, as used herein, a "legacy display" or "UCN status display" refers to a diagnostic display configured for a Token Bus controlled network that shows the status of the network nodes (FTE devices) including their cable status in a time multiplexed fashion with the status of the different FTE devices contained in a specific UCN at any given time, including the redundant cable state. The Cable Status Word (CSW) location is what is used by such displays to show changes in cable status. An updated FTE cable status is obtained from the FTE devices. The updated FTE cable status is stored, such as in an FTE update table in a memory of a Enhanced Network Interface Module (ENIM) of the EUCN.

A UCN CSW is compiled using the included cable status bits allocated to represent the updated FTE cable status to display changes in Ethernet cable status. The FTE cable status including bad cable/cable errors (cable noise and cable silence) is then displayed on the UCN status display.

DETAILED DESCRIPTION

Figure 1A:
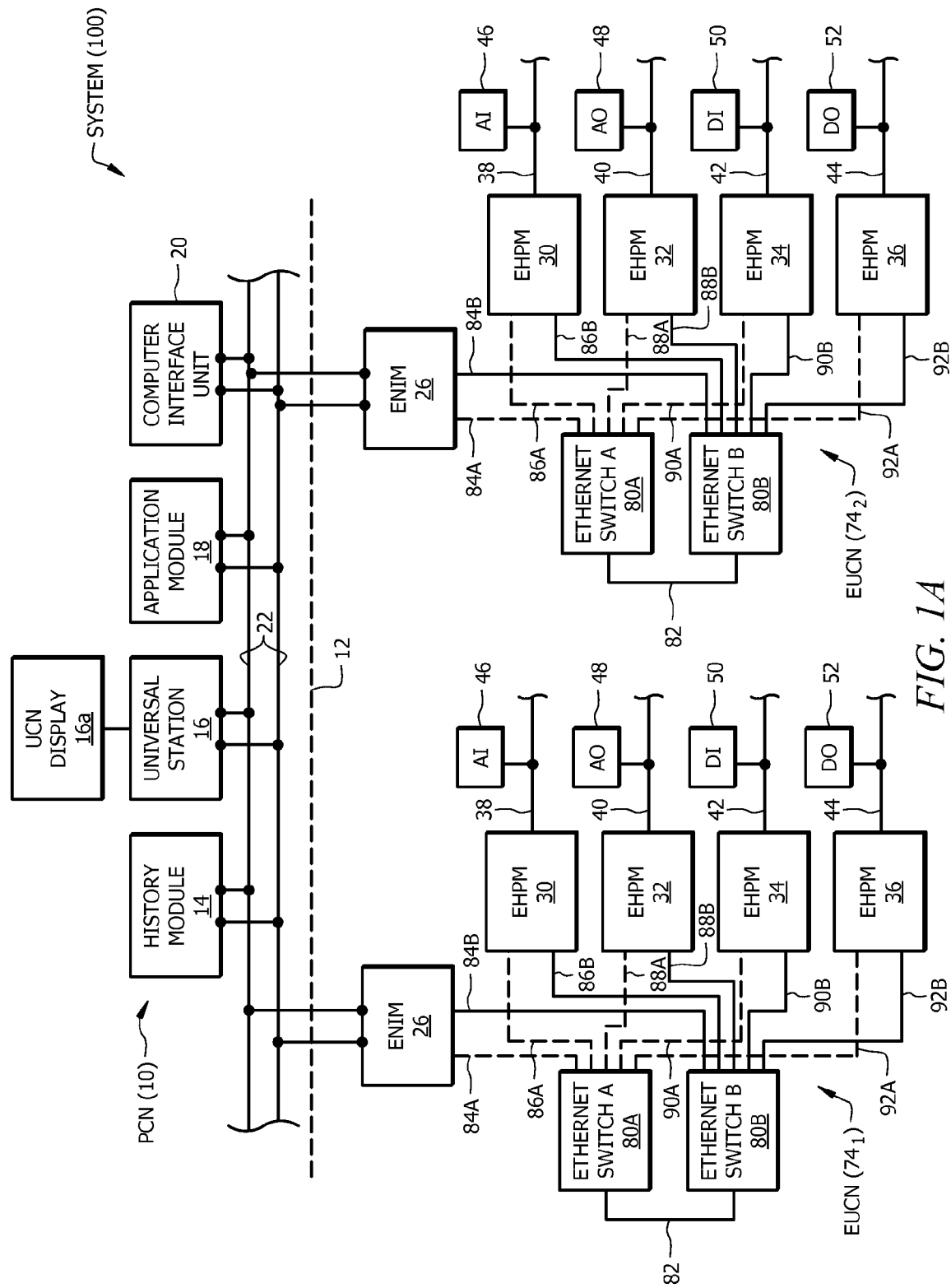
FIG. 1A is a schematic block diagram of process control system having a plurality of EUCNs controlled by a plant control network (PCN) which is a token passing LAN.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Referring to FIG. 1A, a process control system 100 is shown including a PCN 10 having the components which lie above dashed line 12 being a token passing LAN, which controls a plurality of EUCNs with EUCN $74_1$ and EUCN $74_2$ being shown (collectively or individually referred to herein as EUCN 74). Modules 14, 16, 18, and 20 of PCN 10 have various specialized functions and each is connected to a communication medium, dual redundant cables, of plant control bus 22 over which the modules shown as 14 (history module), 16 (universal station), 18 (application module), and 20 (computer interface unit) communicate. The universal station 16 is shown having a UCN status display 16a. Using disclosed UCN cable status words (CSWs) described below read from ENIMs, the UCN status display displays updated FTE cable status as UCN cable status, such as by manipulating "A" and/or "B" text characters by backlighting their color (e.g., in red). PCN 10 generally communicates with a large number of distributed digital process control and data acquisition subsystems, with only two such subsystems, EUCN $74_1$ and $74_2$ illustrated in FIG. 1A for simplicity. However, disclosed embodiments apply to process control systems having as few as one EUCN 74.

EUCN 74 is particular FTE network, both originally created by Honeywell International designed to provide rapid network redundancy. A EUCN is functionally equivalent to the universal control network shown as UCN 24 in FIG. 1 of U.S. Pat. No. 4,964,120 to Mostashari which instead of Ethernet cable is entirely coaxial cable-based. A EUCN implements an emulated token bus over Ethernet.

Each of the EUCNs $74_1$ and $74_2$ include a plurality of Enhanced High Performance Process Managers (EHPM's) shown as EHPM 30, 32, 34 and 36 and an ENIM 26. Each EUCN device is connected to a pair of Ethernet switches (Ethernet switch A 80A, and Ethernet switch B 80B) using standard Ethernet cables (84A,84B,86A,86B,88A,88B,90A, 90B,92A,92B,94A,94B). A cross-connect cable 82 links Ethernet Switch 80A to Ethernet Switch 80B.

Each EUCN $74_1$ and $74_24$ is an Ethernet-based PCN LAN. The EUCN 74 communicates with the PCN 10 through its own ENIM 26 which provides communications and data translation facilities between plant control bus 22 and the Ethernet cables (84A,84B,86A,86B,88A,88B,90A,90B, 92A,92B,94A,94B) of the EUCNs 74. EHPM's 30, 32, 34, 36 control devices in the plant such as valves, switches, etc. I/O modules AI 46, AO 48, DI 50, and DO 52 provide an interface to field devices (not shown), such as valves, pressure switches, pressure gauges, thermocouples in the plant. AI module 46 converts analog signals from a source of analog signals, to signals acceptable to EHPM 30 and is designated AI for analog input. AO module 48 converts digital output signals of EHPM 32 to analog signals and is designated AO. DI module 50 converts digital input signals applied to signals acceptable to EHPM 34. DO module 52 converts output signals of EHPM 36 to digital signals for a control device. The I/O modules are connected to respective EUCN devices (30, 32, 34 and 36) by Ethernet cables 38, 40, 42 and 44.

Figure 1B:
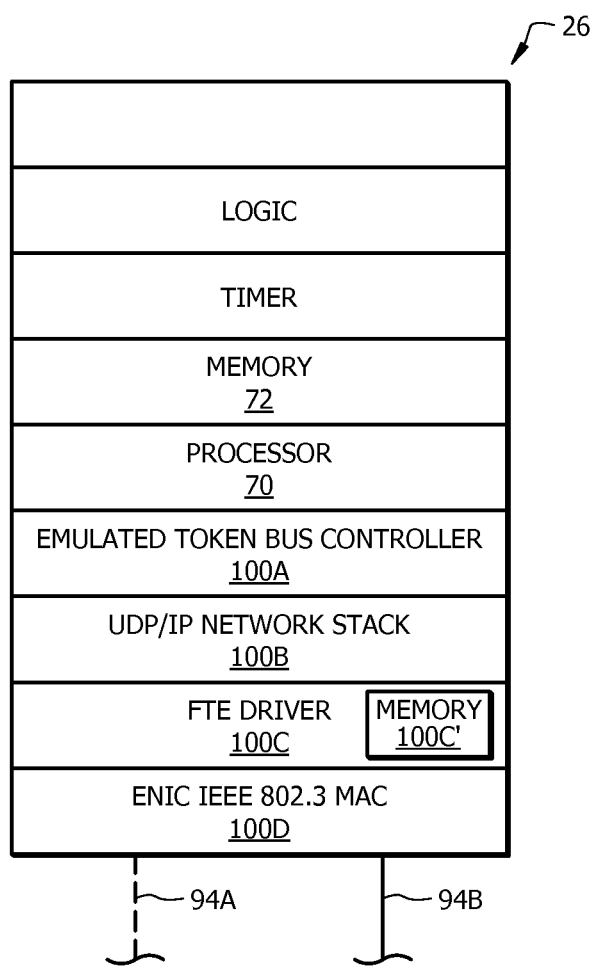
FIG. 1B is a schematic block diagram of an ENIM within one of the EUCNs of FIG. 1A, identifying the elements/subsystems which are common to each of the ENIMs.

The ENIM 26 and EHPM 30, 32, 34, and 36 in each EUCN 74 generally have the same comment elements or subsystems. In FIG. 1B the common elements of ENIM 26 are shown, which could also represent the elements of EHPMs 30, 32, 34 or 36. ENIM 26 includes a processor 70 and memory 72 which can be from commercially available devices.

ENIM 26 also includes an Emulated Token Bus Controller software 100A and a redundant pair of Ethernet Network Interface Controllers (ENIC), transceivers and associated components implementing the media access control (MAC) portion of the IEEE 802.3 (Ethernet) interface shown as IEEE 802.3 MAC 100D. The FTE Driver 100C provides transparent network redundancy to the User Datagram Packet (UDP)/ Internet Protocol (IP) Network Stack 100B used to encapsulate UCN messages in UDP packets. The FTE Driver 100C includes an associated memory 100C'. All EUCN devices (ENIM 26, EHPMs 30, 32, 34, 36) can implement the Honeywell FTE driver 100C and be members of the same FTE Community. A FTE community includes devices that are configured to join the same IP Multicast group, each with a unique FTE device index. More complex variations on the FTE network topology are possible. This simplest of topologies is shown in FIG. 1A for illustrative purposes only.

With the development of the EUCN 74 shown in FIG. 1A, using disclosed embodiments the redundant cable status for the EUCN devices (e.g. ENIM 26 and EHPM(s) 30, 32, 34 and 36) is now able to be shown to the user (typically at the Universal Station 16 in FIG. 1A) as a FTE status, as opposed to a physical, coaxial cable status based on noise and silent detection disclosed in U.S. Pat. No. 4,964,120 to Mostashari for a legacy UCN coaxial cable in a token bus controller (TBC)-based network. Disclosed embodiments thus provide a way to represent the FTE cable status seamlessly to existing users without modifying the way that existing system status displays operate. This Disclosure includes embodiments that allow existing legacy status displays in a process control system, such as in a distributed control system (DCS), to display bad Ethernet cable/Ethernet cable errors (Cable noise and Cable Silences) for EUCN nodes in the same way as the coaxial, legacy UCN network displays these errors.

The FTE status is generally used to propagate the proper cable status information down to the legacy Cable State Machine (CSM), which is a software mechanism implemented in application layer software run by processor 70 of the EHPMs 30, 32, 34, 36 or the ENIM 26 shown in FIG. 1B, to drive the proper cable state. This, in turn, allows the proper FTE cable status to be displayed on the UCN status display 16a to the user (e.g., at Universal Station 16 in FIG. 1A) for the FTE devices in the EUCN, as if the user was looking at the legacy UCN devices/nodes' cable status. In other words, in disclosed embodiments the FTE cable status is now shown to the user on the existing legacy status displays as UCN cable status, and the FTE cable status also maintains the proper states of the existing CSM.

As noted above, a UCN status display shows the status of the different FTE devices contained in one specific UCN at any given time, including the redundant cable state. Existing customers have gained familiarity with this type of display and know how to use it to troubleshoot UCN cable problems when coaxial cables are used. For these UCN status displays, EUCN devices (for example, ENIMs and EHPMs, but the I/O modules (e.g., AI 46, AO 48, DI 50, and DO 52 in FIG. 1A) only when specially equipped for Ethernet communications) translate their individual FTE Status (including any cable status changes) into the existing UCN CSW which is used to display the overall UCN cable status to the user. If any FTE cable is bad, an overall aggregated alarm is first displayed to the user, which in turn prompts the user to open the UCN status display where they can then see the bad cable status on the specific node (device) which has the FTE cable problem.

There are a plurality of layers of communications involved in implementing compiling disclosed UCN CSWs having proper bits set based on changes to the FTE Status value. The FTE Status (e.g., updated on a 1 second period) can then be used to update the UCN CSW which contains the UCN cable status that is used by existing UCN status displays to display the Ethernet cable status.

Figure 2A:
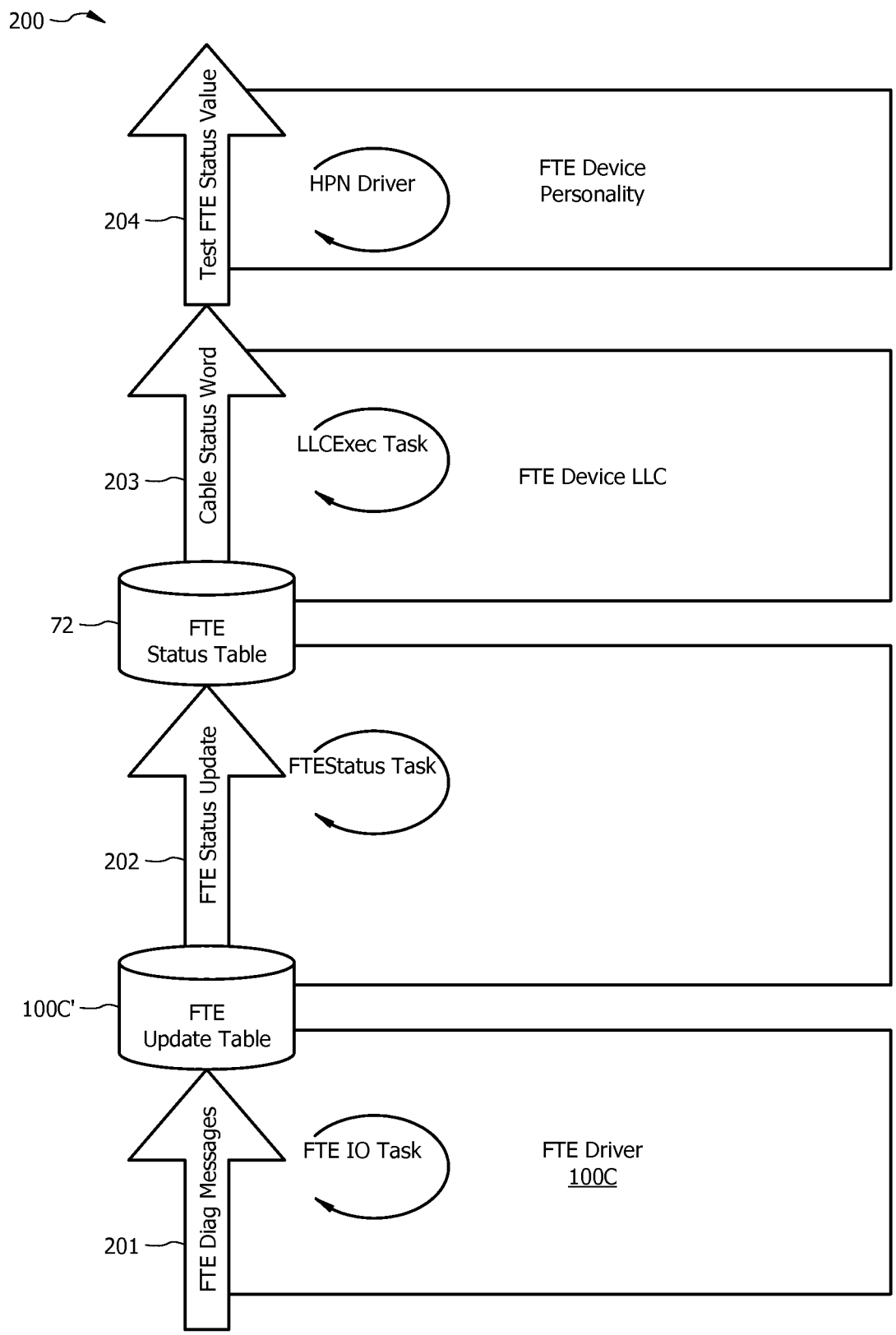
FIG. 2A is a hardware enhanced flowchart/flow diagram of an example method which describes the configuring of layers for setting the bits in a UCN CSW based on changes to the FTE Status value, according to an example embodiment.

A hardware enhanced flowchart/flow diagram for the example method 200 shown in FIG. 2A describes configuring of the layers for setting bits in the UCN CSW based on changes to the FTE Status value. Step 201 comprises collecting updated FTE cable status information from the respective FTE devices in the EUCN (ENIM 26, and EHPM's 30, 32, 34 and 36). The FTE status information is generally received from UDP multicasts from the FTE devices, which is shown in FIG. 2A stored in an FTE Update Table in a memory 100C' associated with a FTE driver of the ENIM (see step 202 below), which indicates the FTE devices that have sent diagnostic messages. The FTE devices send FTE diagnostic messages for this purpose which can be transferred to application processes in a data transfer call to memory 100C'.

The FTE diagnostic messages contain status arrays representing each particular FTE device's view of the Ethernet paths to other FTE devices being either good or bad. In addition to the FTE Status, the duplicate state of each device can be maintained. The EUCN annunciations describe the emulated EUCN node status of the device. The annunciation gives more detailed characteristics of the device including address information (e.g., the message can include the EUCN node number, IP address, subnet mask, authentication group, etc.).

Step 202 comprises the FTE Status Task periodically providing a FTE status update where heard FTE devices based on update information in the FTE Update Table generate an FTE Status Table, shown stored in the memory 72 of an ENIM 26. Memory 72 of ENIM 26 may be considered a "shared" memory as it can be accessed by multiple (two or more) different computer tasks (or processes), where the respective tasks can see a common, shared piece of memory. The FTE Status Table represents the FTE status of all FTE devices in the FTE community, which can comprise FTE devices across a plurality of EUCNs for systems including a plurality of EUCNs. The FTE status update includes local cable status as well as a update table of all 'heard' FTE device/nodes. "Local" as used in "local devices' cable status" means the FTE cable status of an individual node's (FTE device's) connection to the network. The FTE Status Task generally also "ages" last heard values, such as using a predetermined aging time. For example, the processor 70 of ENIM 26 can read and then clear the memory 100C' of the FTE driver 100C.

Step 203 comprises the local EHPM OR ENIM link layer control (LLC) layer executing an LLCExec Task which fills the bits in the existing UCN CSWs as well as providing the FTE Status location (a.k.a. TBC_FTESTS), which can be reserved to a known location in the memory 72 of an ENIM 26. An "existing" UCN CSW means already being in a known memory location that is accessible by the LLCExec task.

Finally, in step 204 the FTE Status locations from the memory 72 of an ENIM 26 are used by the FTE device driver software which can run as a periodic task in the ENIM or EHPM software for testing the FTE Status value location, so that memory 72 of ENIM 26 functions as a shared memory. In one embodiment, the FTE Status value location has only 3 usable bits, and is updated periodically (e.g., once a second). Testing of the FTE Status value location can be used to determine if a change to the UCN CSW needs to be made, and what the specific change to the UCN CSW is Bits in the UCN CSW are changed to be what the FTE Status is for the local node. Operators at the legacy UCN status display(s) (e.g., at the Universal Station 16 in the PCN 10 shown in FIG. 1A monitor for changes in the UCN CSW, (specifically, changes to the "Cable A Silence", "Cable B Silence", "Cable A Noise", and "Cable B Noise" bits in the UCN CSW, see bits 2-5 on the UCN CSW in FIG. 3 described below), and the UCN CSW is thus able to be used to display failures to the users in a graphical interface (e.g. UCN Status Display). The UCN Status Display on the Universal Station 16 reads the disclosed UCN CSWs from the UCN nodes in the FTE status table. Existing software (at this node (e.g., Universal Station 16) decodes the disclosed UCN CSW and displays the updated FTE cable status on the UCN status display. There is no need for revising the software used by the UCN status display.

Figure 2B:
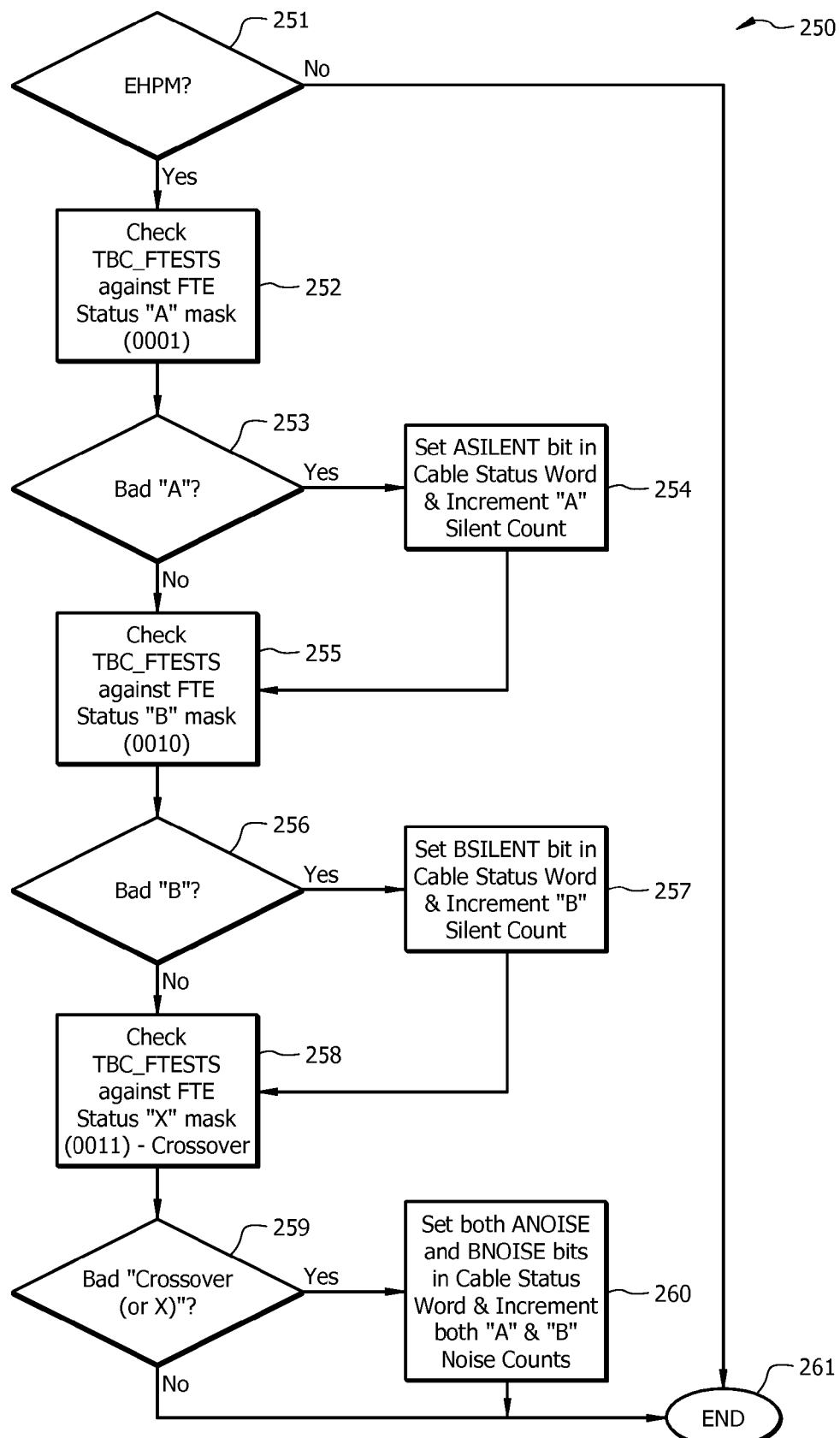
FIG. 2B is a flowchart that shows steps in a method that can be used to set the CSW bits to display FTE cable status as UCN cable status, providing an example how to change the UCN CSW.

FIG. 2B is a flowchart that shows steps in a method 250 that can be used to set the proper CSW bits to display FTE cable status as UCN cable status Step 251 checks whether the device is an EHPM. If the device is not an EPHM, method 250 proceeds directly to end 261. If the device is an EPHM, the method proceeds step 252 which checks the TBC_FTESTS value (which as noted above can have only 3 usable bits, which can be updated once a second) against FTE Status "A" mask (0001) which can be used to determine if there is a bad Ethernet cable "A". In step 253, if there is a bad Ethernet cable "A", step 254 is executed where an ASILENT bit is set in the UCN CSW and there is an increment of "A" in the silent count. In step 253, if there is no bad Ethernet cable "A", step 255 is executed where the TBC_FTESTS value is checked against FTE Status "B" mask (0010) which can be used to determine if there is a bad Ethernet cable "B".

In step 256, if there is a bad Ethernet cable "B", step 257 is executed where an BSILENT bit is set in the UCN CSW and there is an increment of "B" in the silent count. In step 258, the TBC_FTESTS value is checked against FTE Status "X" mask (0011) which can be used to determine if there is a bad Ethernet cable crossover. In step 259, if there is a bad Ethernet cable crossover (or X), step 260 is executed where the ANOISE and BNOISE bits in the UCN CSW are set and there is an increment of both "A" and "B" in the noise counts, and step 261 (end) is reached. In step 259, if there is not a bad Ethernet cable crossover (or X), step 261 (*end*) is reached. The fourth bit (Bit 3) is a don't care bit, which can be used to represent the crossover from Ethernet Cable A to Ethernet Cable B. The FTEStatus word (a.k.a. TBC_FTESTS) can thus be:

| FTEStatus word (a.k.a. TBC_FTESTS) | Bit Meaning |
|---|---|
| Bit 2 (0100) | Crossover Cable Status Bit |
| Bit 1 (0010) | Cable B Status Bit |
| Bit 0 (0001) | Cable A Status Bit |

Figure 3:
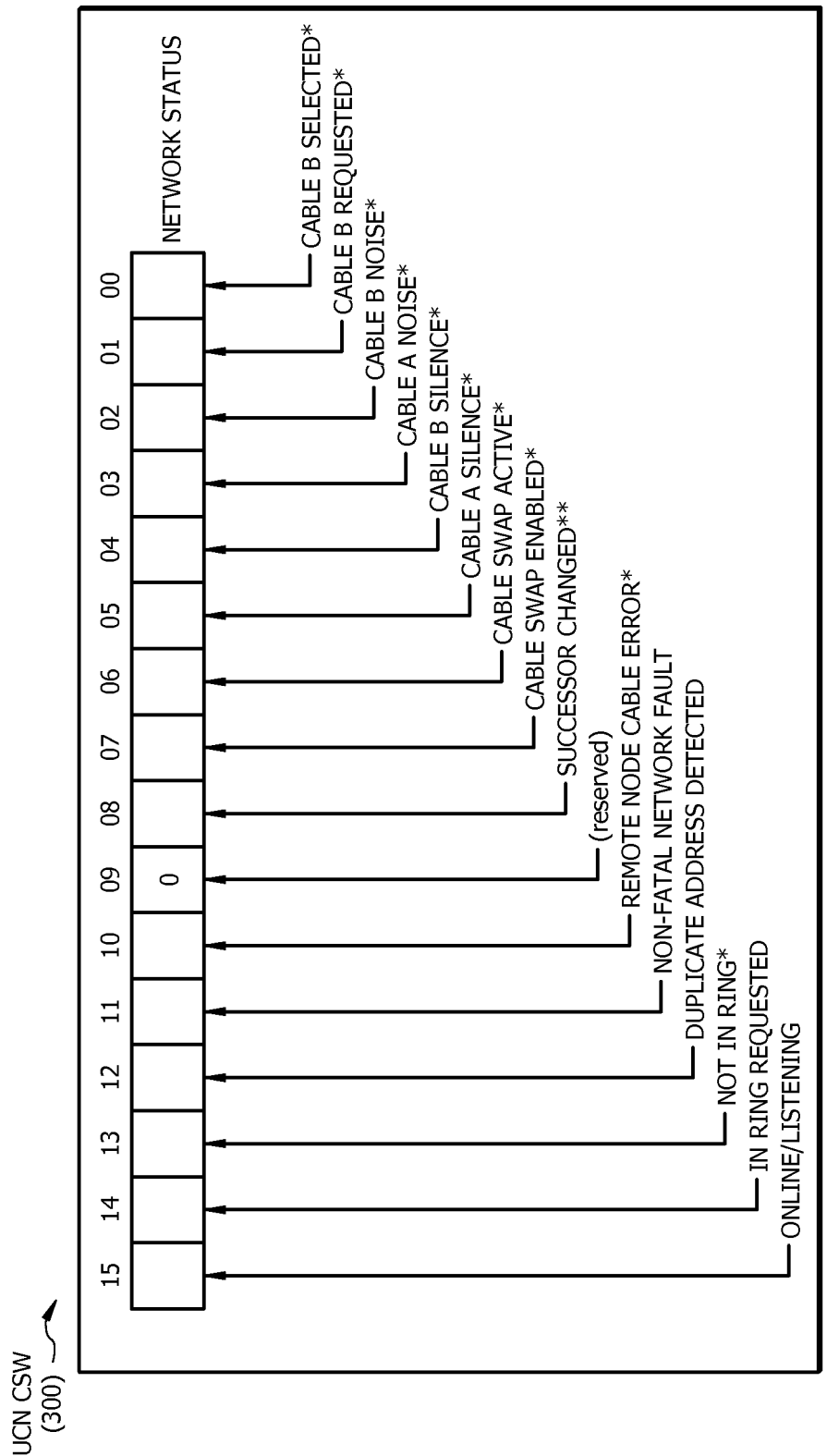
FIG. 3 shows the position (location) of the "Cable A Silence", "Cable B Silence", "Cable A Noise", and "Cable B Noise" bits in an example 16 bit UCN CSW shown.

FIG. 3 described below shows the position of the "Cable A Silence", "Cable B Silence", "Cable A Noise", and "Cable B Noise" bits in the example 16 bit UCN CSW 300 shown. As noted above, the CSW location (bits 02 to 05) in UCN CSW 300 is what is used by legacy UCN status displays to show changes in Cable Status.

There are other changes that can be made to the known CSM, all of which can be implemented in software. The modifications to the existing CSM can be as follows:

In the existing CSM, for an ENIM or for an EHPM, single faults can now be treated as no faults because there are other FTE paths in which to make communication messages flow (only for ENIM and EHPM devices). To help "trick" the existing CSM, as long as the FTE cable status is good, a Frame Check Message (FCHK) message is not sent, but instead acts as if one has been received (only for ENIM and EHPM devices). Finally, as noted above, the bits in the UCN CSW are changed to be what the FTE Status is for the local node.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of displaying fault tolerant Ethernet (FTE) cable status, comprising:
   collecting an updated FTE cable status from each of a plurality of FTE devices (FTE devices) during operation of a process control system comprising a plant control network (PCN) which is a token passing local area network (LAN) including an UCN status display configured for token bus control coupled to an Enhanced Universal Control Network (EUCN) that is Ethernet connected including an Enhanced Network Interface Module (ENIM) that said FTE devices are Ethernet coupled to;
   storing said updated FTE cable status from each of said FTE devices in a memory;
   compiling a UCN cable status word (CSW) including a plurality of cable status bits allocated for representing said updated FTE cable status for each of said FTE devices, wherein locations for said cable status bits in said UCN CSWs are used by said UCN status display to show changes in cable status;
   reading said UCN CSWs at a node having said UCN status display, and
   displaying said updated FTE cable status on said UCN status display.

2. The method of claim 1, wherein said locations used for said cable status bits include those allocated for cable A silence, cable B silence, cable A noise and cable B noise.

3. The method of claim 1, wherein said UCN status display displays said updated FTE cable status as UCN cable status by manipulating "A" and/or "B" text characters by backlighting their color.

4. The method of claim 1, further comprising providing a user an option to select another view while viewing said updated FTE cable status on said UCN status display, said another view providing additional information including a cable silence and/or noise status for any of said FTE devices.

5. The method of claim 1, wherein said method is practiced without revising software used by said UCN status display.

6. The method of claim 1, wherein said updated FTE cable status is stored as an FTE Update Table in a memory associated with a FTE driver of said ENIM.

7. The method of claim 6, further comprising periodically updating heard ones of said FTE devices based on said FTE Update Table, and then clearing said FTE Update Table after reading said FTE Update Table by a processor of said ENIM.

8. A computer program product, comprising:
   a non-transitory data storage medium that includes program instructions executable by a processor to enable said processor to execute a method of displaying fault tolerant Ethernet (FTE) cable status in a process control system comprising a plant control network (PCN) which is a token passing local area network (LAN) including an UCN status display configured for token bus control coupled to an Enhanced Universal Control Network (EUCN) that is Ethernet connected including an Enhanced Network Interface Module (ENIM) that has a plurality of FTE devices (FTE devices) that are Ethernet coupled to, said method including:
   collecting an updated FTE cable status from each of said FTE devices during operation of said process control system;
   storing said updated FTE cable status from each of said FTE devices in a memory;
   compiling a UCN cable status word (CSW) including a plurality of cable status bits allocated for representing said updated FTE cable status for each of said FTE devices, wherein locations for said cable status bits in said UCN CSWs are used by said UCN status display to show changes in cable status,
   reading said UCN CSWs at a node having said UCN status display, and
   displaying said updated FTE cable status on said UCN status display.

9. The computer program product of claim 8, wherein said locations for said cable status bits include those allocated from cable A silence, cable B silence, cable A noise and cable B noise.

10. The computer program product of claim 8, wherein said UCN status display displays said updated FTE cable status as UCN cable status by manipulating "A" and/or "B" text characters by backlighting their color.

11. The computer program product of claim 8, wherein said method further comprises providing a user an option to select another view while viewing said updated FTE cable status on said UCN status display, said another view providing additional information including a cable silence and/or noise status for any of said FTE devices.

12. The computer program product of claim 8, wherein said program instructions are configured for being exclusively implemented at nodes having said FTE devices.

13. The computer program product of claim 8, wherein said method further comprises periodically updating heard ones of said FTE devices based on an FTE Update Table stored in a memory associated with a FTE driver of said ENIM, and then clearing said FTE update table after reading said FTE Update Table by a processor of said ENIM.

* * * * *